Dec. 30, 1941.  F. CARTLIDGE  2,268,373
OVERLOAD RELEASE CLUTCH
Filed Nov. 10, 1939
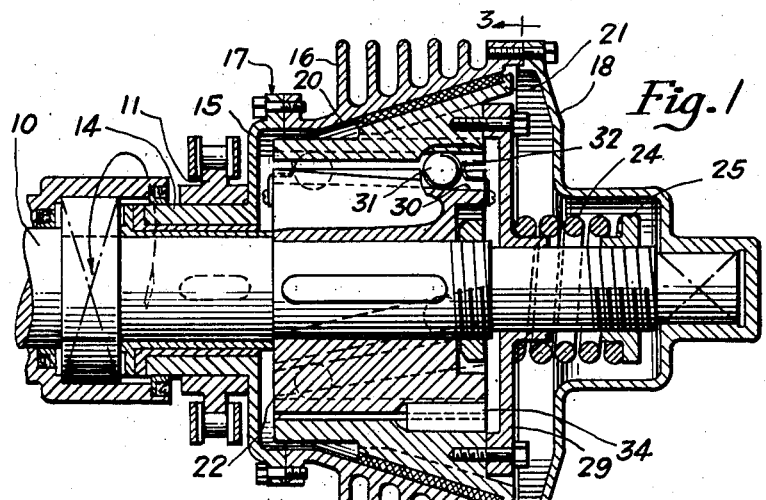
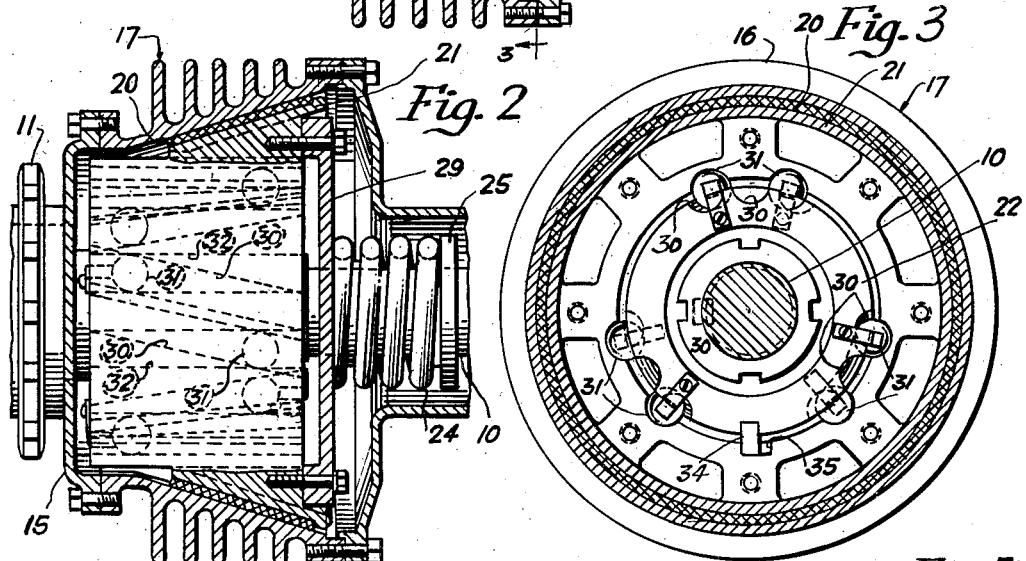
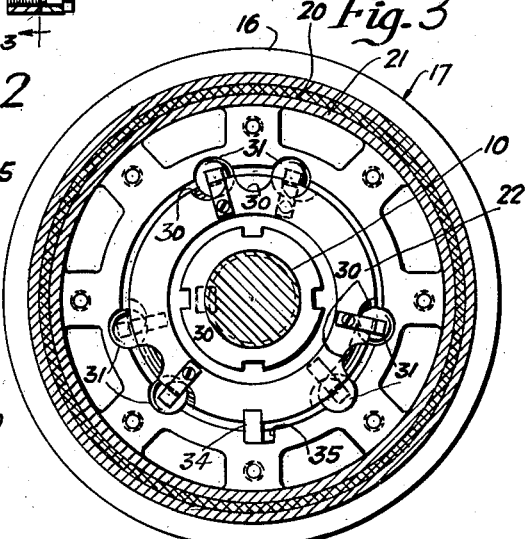
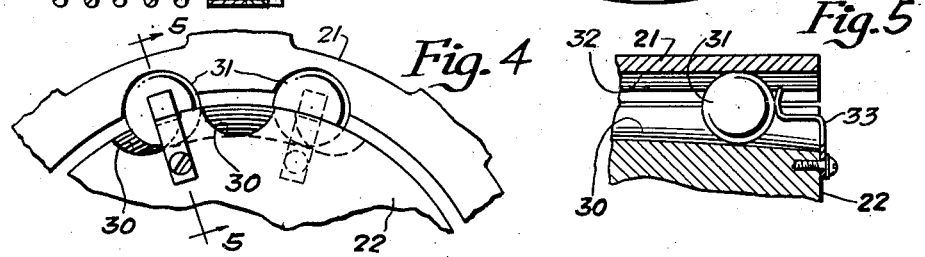
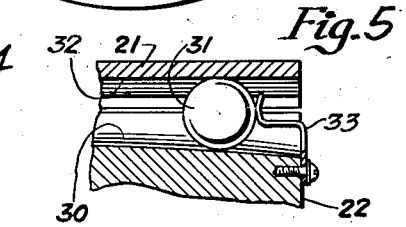
INVENTOR
Frank Cartlidge
BY
Clarence F. Poole
ATTORNEY Patented Dec. 30, 1941

2,268,373

UNITED STATES PATENT OFFICE 2,268,373

OVERLOAD RELEASE CLUTCH

Frank Cartlidge, Chicago, Ill., assignor to Goodman Manufacturing Company, Chicago, Ill., a corporation of Illinois Application November 10, 1939, Serial No. 303,772

1 Claim. (Cl. 64—30)

This invention relates to improvements in overload release clutches, and has as its principal objects to provide a novel form of clutch arranged to disconnect a driving member from a driven member upon predetermined overload conditions and connect these members so one may be driven from the other when these overload conditions are relieved.

A more specific object of my invention is to provide a form of overload release clutch wherein the driving member is disconnected from the driven member by means of a series of balls riding in races formed in two members, the races in one member being at a different angle than the races in the other member and being so arranged that upon predetermined overload conditions, said balls will cause one member to move across the face of the other in a helical path, to disconnect said driving member from said driven member.

Other objects of my invention will appear from time to time as the following specification proceeds and with reference to the accompanying drawing wherein:

Figure 1 is a view in longitudinal section of an overload release clutch constructed in accordance with my invention;

Figure 2 is a partial fragmentary longitudinal sectional view of the clutch shown in Figure 1, with certain parts in full which are shown in section in Figure 1;

Figure 3 is a transverse sectional view of the clutch shown in Figure 1, looking in the direction of line 3—3 of Figure 1, and taken substantially along this line;

Figure 4 is an enlarged detail view showing certain details of my invention; and Figure 5 is a sectional view taken substantially along line 55 of Figure 4.

The embodiment of my invention illustrated in the drawing is shown as being incorporated in the drive for a shaft 10 through a sprocket 11 keyed on a hub 14 of a flanged member or end plate 15, enclosing one end of a casing 16, for an overload release clutch 17. The opposite end of said casing is closed by an end plate 18, herein shown as being journaled on the end of the shaft 10 at its end. Said end plates are secured to the ends of said casing by means of suitable cap screws, in a usual manner.

The casing 16 forms a driving member for the clutch 17, which may be of any well-known type but in the interest of simplicity is herein shown as being of the friction cone type. An inner periphery of said casing is of a frusto-conical formation, adapted to be engaged by a frusto-conical friction band 20, mounted on the frusto-conical outer periphery of an engaging member 21. Said engaging member encircles a driven member 22, and is held in spaced relation with respect thereto by means of balls 31, 31, riding in a plurality of pairs of transversely extending races 30, 30 and 32, 32, formed in the members 22 and 21 respectively. Said races and their function will hereinafter more clearly appear as this specification proceeds.

The friction band 20 is engaged with the inner periphery of the casing 16 by a compression spring 24, encircling the shaft 10. Said compression spring abuts a collar 25 threaded on said shaft at one of its ends, and its opposite end encircles the hub of and abuts the outer end of a flanged member 29, secured to an end of said engaging member by suitable cap screws, in a usual manner.

Referring now in particular to the means for rectilinearly moving the engaging member 21 against the compression spring 24, to release the friction band 20 from the inner periphery of the casing 16 upon overload of the shaft 10, the pairs of spaced apart transversely extending races 30, 30 formed in the outer periphery of the driven member 22 extend across the periphery of said driven member in a helical path, the angle of the helix of which is determined by the load at which it is desired the clutch to release. The pairs of spaced apart races 32, 32 provided in the inner periphery of the engaging member 21 are spaced apart a greater distance than the races 30, 30, and extend transversely across the inner periphery of said engaging member at a different angle than the races 30, 30. Said last mentioned races cross the races 30, 30 at predetermined points (see Figure 2). Said races are so spaced and their paths with respect to each other are such that one ball 31 in one race 30 may engage a corresponding race 32 at the point where the race 32 crosses the race 30. Moreover, the point where one race 32 of the pair of races 32, 32 crosses the corresponding race 30 is adjacent one end of the driven member 22, and the point where the other race 32 of said pair of races crosses the other race 30 of the pair of races 30, 30 is adjacent the other end of said driven member.

A retaining spring 33, herein shown as being a leaf spring, extends in each race 30 at the end thereof adjacent the ball 31, to retain said balls in position in their respective races and to prevent accidental displacement thereof.

A feather key 34 is provided to limit twisting movement between the engaging member 21 and driven member 22. Said feather key extends within a widened keyway or slot 35 formed in the engaging member 21, to permit a predetermined amount of twisting movement of said engaging member.

It may be seen from the foregoing that when the casing 16 is driven by the sprocket 11 in a counterclockwise direction, as indicated by the arrow in Figure 1, that the friction band 20, engaged with the inner periphery of said casing by the spring 24, will cause the engaging member 21 to be driven by said casing. Upon normal driving conditions, the driven member 22 will be driven from said driving member through the balls 31, 31, engaging the respective races 30, 30 and 32, 32 at the points where said races cross. Upon normal load conditions the tendency is for the balls 31, 31 to move the engaging member 21 to a disengaged position, said member being held in position by the spring 24 only. Upon overload of the shaft 10, when reaction of the balls 31, 31 against the races 32, 32 is greater than the force with which the spring 24 engages the friction band 20 with the inside of the casing 16, said balls will move said engaging member against said spring, to disengage the clutch. This helical movement of said engaging member is caused by the difference in angle between the races 30, 30 and 32, 32 and the reaction between the balls 31, 31 and these races. When these overload conditions have been relieved, said compression spring will again engage said friction band with the inner periphery of said casing and the drive will be as before.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claim.

I claim as my invention:

In an overload release clutch, a driving member, a driven member, one of said members including a member of a substantially cylindrical form and a member encircling said cylindrical member of a substantially annular form, the inner periphery of said annular member having a plurality of pairs of parallel spaced races extending thereacross in rectilinear paths to the sides thereof, said cylindrical member having a plurality of pairs of races extending across its outer periphery at the same helical angle so one of said races of said pairs of races extending across said annular member will cross another race of a pair of races extending across said cylindrical member adjacent one end of said member and another race of said pair of races extending across said annular member will cross the other race of said pair of races extending across said cylindrical member, adjacent the opposite end of said member, and balls registering for engagement with said races at the points where said races cross, for holding said members in spaced relation with respect to each other and for moving one of said members in a direction across the face of the other in a helical path, upon a predetermined load on said clutch, to release said clutch.

FRANK CARTLIDGE.

CERTIFICATE OF CORRECTION.

Patent No. 2,268,373.  December 30, 1941.

FRANK CARTLIDGE.

It is hereby certified that error appears in the printed specification of the above numbered patent requiring correction as follows: Page 2, second column, line 17, in the claim, after "paths" insert --, perpendicular--; and that the said Letters Patent should be read with this correction therein that the same may conform to the record of the case in the Patent Office.

Signed and sealed this 17th day of February, A. D. 1942.

(Seal)

Henry Van Arsdale,
Acting Commissioner of Patents.